Aug. 6, 1946.　　　C. F. RUEBENSAAL　　　2,405,329

METHOD OF MOLDING GLOVES

Filed May 23, 1944

INVENTOR.
CLAYTON F. RUEBENSAAL
BY
Donald W. Farrington
ATTORNEY

Patented Aug. 6, 1946

2,405,329

UNITED STATES PATENT OFFICE 2,405,329

METHOD OF MOLDING GLOVES

Clayton F. Ruebensaal, Baltimore, Md., assignor to The Glenn L. Martin Company, Middle River, Md., a corporation of Maryland Application May 23, 1944, Serial No. 536,877

6 Claims. (Cl. 18—58)

This invention relates generally to the art of molding synthetic resins. It is particularly concerned with a new process for molding hollow articles composed of thermoplastic synthetic resins.

Various hollow articles composed of synthetic resins have been made heretofore by dipping procedures. However, these procedures are time consuming because a simple form has to be dipped a number of times into a liquid to obtain a wall of substantial thickness. One expedient which has been proposed for saving much of the time consumed in dipping is to mold the resin about a core, but an outstanding difficulty in molding elongated articles is that the thickness of the article, particularly near the free end of the core in the mold cavity, varies considerably because of shifting or deflection of the free end of the core. Attempts have been made to overcome this shifting or deflection by using different kinds of core supporting means and also by thickening the core and making it more rigid and therefore more resistant to deflecting forces.

The importance of positively locating the core in the mold cavity and preventing any shifting or deflection of the core may be illustrated by considering a mold for a glove which is to have a wall thickness near the ends of the fingers of for example about .010". If the core is about 18" long a variation of as little as about .002" at the supported end of the core may cause a variation of as much as about .006" to about .008" near the free end of the core, that is, near the finger tips. Such a variation of .007" would result in a wall thickness of as much as .017" on one side of the fingers and as little as .003" on the opposite side of the fingers.

The present invention aims to prevent such variation in wall thickness of molded articles and achieves this aim by the steps of positively positioning the free end of the core in the mold cavity by movable mechanical means, then utilizing part of the resin in the mold cavity to maintain the position of the core in the mold cavity when the movable means are retracted and while the remainder of the resin flows and sets around the free end of the core.

Figure 1:
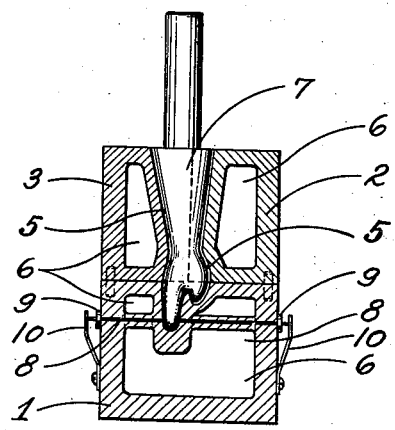
Figure 2:
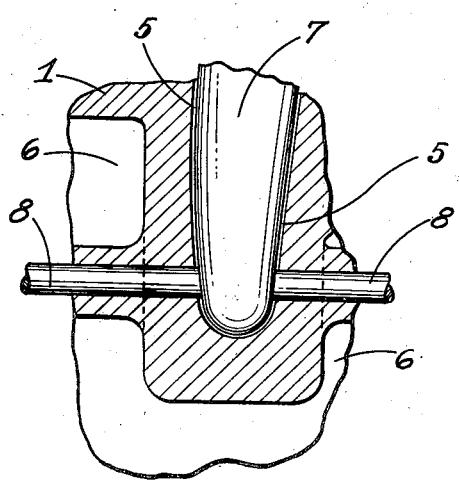

The present invention will be better understood by those skilled in the art by the following, rather detailed but not limiting description thereof taken in conjunction with the drawing accompanying and forming a part of this specification and in which Figure 1 is a vertical cross sectional view of a multipart glove mold with the core shown in elevation; and Figure 2 is an enlarged fragmentary view showing the lower part of the mold of Figure 1.

The mold of Figure 1 consists of a plurality of mold sections, in this case three, which are designated by numbers 1, 2 and 3 and which when assembled define a cavity 5 suitable for a glove. These mold sections are jacketed, that is, they are provided with cavities 6 through which heating or cooling fluids may be passed to heat the thermoplastic resin in the mold cavity to a flowable condition or to cool it from a flowable condition to a set condition. A core 7 shaped to the desired inside configuration of the glove extends into the mold cavity 5 and is supported outside of the mold by any suitable or conventional means (not shown).

Near the free end of the core 7, movable mechanical means such as pins 8 extend through the mold section 1 and are engageable with opposite sides of the core. These pins may be provided with shoulders 9 intermediate their ends to abut against the outer surface of the mold sections, and thereby limit the distance the pins may be moved into the mold cavity. Any suitable means, such as springs 10, may be placed against the outer ends of the pins to maintain the shoulders thereof against the mold. Alternatively the movable means may be screw-threaded into the mold section or into inserts carried by the mold sections so that by rotating the pins they may be moved into contact with the core or retracted from engagement therewith. It will be understood that the primary function of the pins is to position the free end of the core in the mold cavity so that the spaces on opposite sides of the core will be substantially equal, or greater on one side than on the other side if such is desired; and that the pins do not serve to support the core in the mold for that function is performed by the core supporting means above the mold. The parts of the pins which extend into the mold cavity should be small so as to occupy as small spaces as possible consistent with sufficient rigidity to prevent shifting or deflection of the core. Steel pins about $\frac{1}{16}$" in diameter have been found to be suitable with glove molds. The spaces left by the small retracted pins are readily filled by the flowable resin without withdrawing resin from other parts of the mold cavity to an extent sufficient to decrease the wall thickness of the final product appreciably.

The process of the present invention may be readily carried out in a mold of the above described type as follows:

The mold sections are assembled about the core and a quantity of a thermoplastic synthetic resin mass which is sufficient to make an article of the desired length and thickness. This may be accomplished by wrapping the resin mass around the core, or preforming the mass into a tube and inserting the core into the tube, or bringing the plasticized resin in granular form into the mold cavity. Then the pins are moved into contact with opposite sides of the core to position the free end of the core so as to leave spaces of the desired size on opposite sides thereof.

When the mold core and resin mass have been assembled, a heating fluid is passed through the cavities 6 in all the mold sections until the resin mass has been changed into a flowable condition. If desired, the heating may continue until the resin mass has flowed and filled substantially all parts of the mold cavity from the bottom upwardly, or when the resin mass is in a flowable condition pressure may be exerted thereon at the open end of the cavity and about the core thereby forcing the resin mass into and filling substantially all parts of the mold cavity below the place of application of such force. When the mold has been filled, the application of heat to the upper mold sections 2 and 3 is discontinued and a cooling medium is passed through those sections to cool and set the resin therewithin. Such cooling will set enough of the resin to provide a means of maintaining the position of the core in the mold after retraction of the core positioning means near the free end of the core. In the illustrated mold this cooling extends from the open end of the mold down to the roots of the fingers of the core. When the cooled resin mass is capable of maintaining the core in its predetermined position in the mold cavity, the pins 8 are retracted from engagement with the core and preferably to the extent that their inner ends are substantially flush with the inner surface of the mold cavity. Since the resin mass about the free end of the core is still in a flowable condition it will flow into and fill the spaces left by retraction of the pins. Then the still flowable resin mass may be cooled and set by passing cooling fluid through the adjacent mold sections.

It will be understood that this process is more expeditious than the dipping process and hence is preferable from a manufacturing standpoint. Furthermore, the resulting products have smooth surfaces and walls, particularly in the finger portions, which may be substantially equal in thickness on opposite sides of the fingers or thicker on one side than on the other, as desired. Moreover, the walls between the fingers may be as thick as desired, thereby avoiding the thin walls which are usually present at those places when the gloves are made by dipping. Thus the present process may be carried out more rapidly than the dipping process and the variety of wall thickness of the finger portions may be regulated as desired.

Although the present invention has been described hereinabove in detail in connection with gloves it will be understood that it is also applicable to a variety of other articles including hot water bottles, boots and in general any hollow article composed of thermoplastic synthetic resins in which maintenance of wall thickness is important.

Having thus described the present invention so that those skilled in the art may be able to practice and understand the same I state that what I desire to secure by Letters Patent is defined in what is claimed.

I claim as my invention:

1. The method of making hollow synthetic resin articles which includes the steps of flowing a thermoplastic synthetic resin about a core having a free end maintained in a predetermined position in a mold cavity by mechanical movable means engaging the core near its free end, cooling and thereby setting part of the resin while maintaining the resin adjacent to said free end in flowable condition, retracting said movable means from engagement with said core, and then cooling and thereby setting the still flowable resin about the free end of the core.

2. The method of making hollow synthetic resin articles which includes the steps of heating and flowing a thermoplastic synthetic resin about a core having a free end mechanically maintained in a predetermined position in a mold cavity by movable means engaging the core near its free end, cooling and thereby setting a sufficiently large part of the resin remote from the free end of the core to maintain the core in its predetermined position without aid from said movable means while maintaining the resin adjacent to said free end in flowable condition, retracting said movable means from engagement with said core, and cooling and thereby setting the still flowable resin about the free end of the core.

3. The method of making hollow synthetic resin articles which includes the steps of flowing a thermoplastic synthetic resin in a mold cavity about a core having a free end engaged near its free end by movable positioning means, cooling and thereby setting part of the resin remote from said means while maintaining the resin adjacent to said free end in flowable condition, utilizing said set part of the resin to maintain the core in its predetermined position after retraction of said movable means, retracting said movable means from engagement with said core, and cooling and thereby setting the still flowable resin about the free end of the core.

4. The method of making hollow synthetic resin articles which includes the steps of flowing a thermoplastic synthetic resin in a mold cavity to fill it from the bottom upwardly about a core maintained in a predetermined position in the cavity by movable means engaging the core near the bottom of the cavity, cooling and thereby setting the resin in the upper part of the cavity while maintaining the resin in the lower part of the cavity in flowable condition, retracting said movable means from engagement with said core, and cooling and thereby setting the still flowable resin in the lower part of the cavity after such resin has flowed into and filled the spaces previously occupied by the movable means while engaging said form.

5. The method of making a hollow molded article which comprises the steps of assembling a core having a free end and in a predetermined position in a mold cavity together with a quantity of thermoplastic synthetic resin sufficient for the desired article, maintaining the core in said position by engaging mechanical movable means therewith near the free end thereof, heating and thereby converting said resins into a flowable mass and flowing it about the core and thereby substantially filling the mold cavity upwardly from the bottom, cooling and thereby setting the resin above said movable means, removing said movable means and utilizing the previously set part of the resin to maintain the core in said predetermined position, and cooling and thereby setting the remainder of said resin.

6. The method of making a hollow molded article which comprises the steps of assembling a core having a free end in a predetermined position in a mold cavity together with a quantity of thermoplastic synthetic resin sufficient for the desired article, maintaining the core in said position by engaging mechanical movable means therewith near the free end thereof, heating and thereby converting said resin into a flowable mass and flowing it about the core and thereby substantially filling the mold cavity from its bottom upwardly, cooling and thereby setting a sufficient amount of the resin in the upper part of the cavity to maintain the core in its predetermined position after retraction of said movable means, retracting said movable means while utilizing the previously set resin to maintain the core in said predetermined position, and cooling and thereby setting the remainder of the still flowable resin after it has flowed into the spaces occupied by the means before retraction thereof.

CLAYTON F. RUEBENSAAL.